US011997155B2

(12) United States Patent
Gavant

(10) Patent No.: US 11,997,155 B2
(45) Date of Patent: May 28, 2024

(54) TRACE CONTEXT OVER FILE TRANSFER COMMUNICATIONS

(71) Applicant: Discover Financial Services, Riverwoods, IL (US)

(72) Inventor: Josh Gavant, Skokie, IL (US)

(73) Assignee: Discover Financial Services, Riverwoods, IL (US)

( * ) Notice: Subject to any disclaimer, the term of this patent is extended or adjusted under 35 U.S.C. 154(b) by 0 days.

(21) Appl. No.: 17/589,866

(22) Filed: Jan. 31, 2022

(65) Prior Publication Data

US 2023/0247084 A1    Aug. 3, 2023

(51) Int. Cl.
*G06F 15/16* (2006.01)
*H04L 67/06* (2022.01)
*H04L 67/1074* (2022.01)
*H04L 67/1097* (2022.01)

(52) U.S. Cl.
CPC .......... *H04L 67/06* (2013.01); *H04L 67/1074* (2013.01); *H04L 67/1097* (2013.01)

(58) Field of Classification Search
CPC . H04L 67/06; H04L 67/1097; H04L 67/1074; H04L 63/123; H04L 41/085; H04L 67/535; G06F 21/6245; G06F 9/466; G06F 2201/87; G06F 2201/86; G06F 21/16
See application file for complete search history.

(56) References Cited

U.S. PATENT DOCUMENTS

| 7,689,532 | B1 * | 3/2010 | Levy | H04L 67/104 |
| | | | | 713/176 |
| 8,258,924 | B2 * | 9/2012 | Hind | G06Q 30/00 |
| | | | | 705/30 |
| 10,594,689 | B1 * | 3/2020 | Weaver | H04L 9/3242 |
| 2007/0282615 | A1 * | 12/2007 | Hamilton | G06Q 10/00 |
| | | | | 705/902 |
| 2008/0263645 | A1 * | 10/2008 | Renter | H04L 63/0428 |
| | | | | 705/66 |
| 2009/0112882 | A1 * | 4/2009 | Maresh | G16H 30/20 |
| 2009/0234967 | A1 | 9/2009 | Kuiffei et al. | |

(Continued)

OTHER PUBLICATIONS

W3C. Trace Context. W3C Recommendation. Nov. 23, 2021, 26 pages [online], [retrieved online Apr. 7, 2022]. Retrieved from the Internet <URL: https://www.w3.org/TR/trace-context/>.

(Continued)

*Primary Examiner* — Suraj M Joshi
*Assistant Examiner* — Hao H Nguyen
(74) *Attorney, Agent, or Firm* — Lee Sullivan Shea & Smith LLP

(57) ABSTRACT

A first computing system is configured to (i) decide to execute a file transfer of at least one file from the first computing system to a second computing system, where the at least one file comprises data content that is related to a distributed transaction and is stored at the first computing system, (ii) before the file transfer is executed, determine at least one global context identifier for association with the file transfer, (iii) associate the at least one file with a data element that is isolated from the data content and contains the determined global context identifier, and (iv) execute the file transfer by transmitting the at least one file and the associated data element for receipt by the second computing system.

20 Claims, 9 Drawing Sheets

(56) References Cited

U.S. PATENT DOCUMENTS

| | | | | |
|---|---|---|---|---|
| 2012/0324589 | A1* | 12/2012 | Nukala | H04L 63/10 |
| | | | | 726/28 |
| 2013/0060579 | A1* | 3/2013 | Yu | H04L 63/06 |
| | | | | 705/3 |
| 2013/0124475 | A1 | 5/2013 | Hildenbrand et al. | |
| 2015/0106437 | A1 | 4/2015 | Hudson et al. | |
| 2015/0120531 | A1 | 4/2015 | Stridh | |
| 2016/0065463 | A1* | 3/2016 | Wang | H04L 45/021 |
| | | | | 370/392 |
| 2016/0360012 | A1* | 12/2016 | Zholudev | H04L 67/02 |
| 2019/0230141 | A1* | 7/2019 | Singh | H04L 65/65 |
| 2020/0022213 | A1* | 1/2020 | Han | H04W 28/0263 |
| 2021/0160156 | A1 | 5/2021 | Lim et al. | |
| 2021/0209065 | A1* | 7/2021 | Rakshit | G06F 16/178 |
| 2022/0400046 | A1* | 12/2022 | Arya | H04L 41/0893 |

OTHER PUBLICATIONS

W3C. Trace Context Protocols Registry. W3C Working Group. Nov. 19, 2019, 4 pages [online], [retrieved online Apr. 7, 2022]. Retrieved from the Internet <URL: https://www.w3.org/TR/trace-context/>.

Trace Context: AMQP Protocol. Mar. 21, 2022, 6 pages [online], [retrieved online Apr. 7, 2022]. Retrieved from the Internet <URL:https://w3c.github.io/trace-context-amqp/>.

International Searching Authority. International Search Report and Written Opinion issued in International Application No. PCT/US2022/053114, dated Apr. 26, 2023, 9 pages.

* cited by examiner

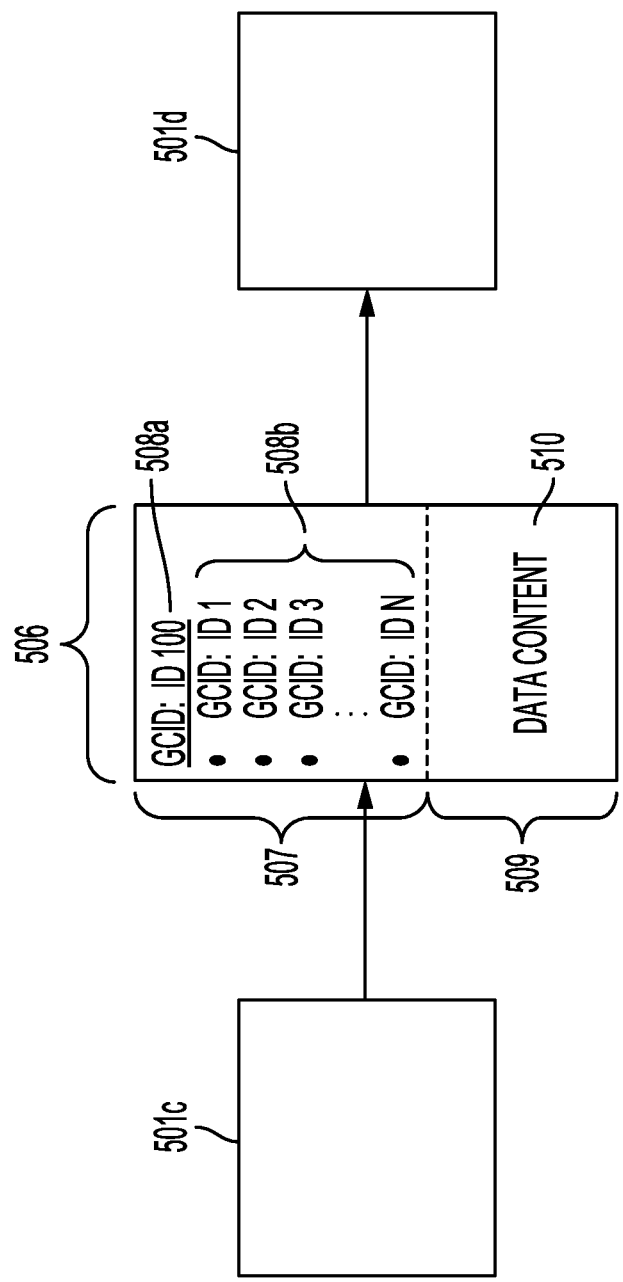
FIG. 5A
FIG. 5B
FIG. 5C

TRACE CONTEXT OVER FILE TRANSFER COMMUNICATIONS

BACKGROUND

Distributed computing environments are increasingly being developed as a collection of loosely coupled software subsystems. In this type of distributed computing environment, each software subsystem is configured to provide a specific service as part of the overall computing platform, and each software subsystem generally has an interface for communicating with other subsystems. Within such a distributed computing environment, a given transaction may traverse many of the individual subsystems, each of which performs some specific functionality to facilitate the overall transaction.

OVERVIEW

Disclosed herein is new technology that facilitates a first subsystem participating in a distributed transaction embedding a global context identifier alongside data content that is to be transmitted to a second subsystem using a file transfer communication.

In one aspect, the disclosed technology may take the form of a method to be carried out by a computing platform that involves (a) deciding to execute a file transfer of at least one file from the first computing system to a second computing system, wherein the at least one file comprises data content that is related to a distributed transaction and is stored at the first computing system, (b) before the file transfer is executed, determining at least one global context identifier for association with the file transfer, (c) associating the at least one file with a data element that is isolated from the data content and contains the determined global context identifier, and (d) executing the file transfer by transmitting the at least one file and the associated data element for receipt by the second computing system.

In some example embodiments, the method may involve, after deciding to execute the file transfer, generating the at least one file comprising the data content that is related to the distributed transaction.

Further, in example embodiments, the method may involve monitoring the computing system for an indication of a command to generate the at least one file comprising the data content that is related to the distributed transaction and detecting the command to generate the at least one file, wherein associating the at least one file with the data element comprises associating the at least one file with the data element based on detecting the command to generate the at least one file.

Further yet, in example embodiments, monitoring the computing system for an indication of a command to generate the at least one file comprises monitoring the computing system for an indication of a command to generate the at least one file at a designated location on a file system of the first computing system.

Still further, in some example embodiments, determining the at least one global context ID comprises generating a new global context ID.

Still further, in some example embodiments, the distributed transaction is an ongoing distributed transaction, and determining the at least one global context ID comprises determining an existing global context ID that is related to the ongoing distributed transaction of which the file transfer will be a part when executed.

Still further, in some example embodiments, determining the existing global context ID comprises extracting the existing global context ID from data received by the first computing system from a third computing system.

Still further, in some example embodiments, associating the at least one file with the data element comprises embedding the data element into the at least one file.

Still further, in some example embodiments, the at least one file is at least one first file, the data element is at least one second file, and associating the at least one file with the data element comprises generating the at least one second file containing the global context identifier.

Still further, in some example embodiments, the method may involve, after the file transfer is executed, transmitting data identifying the file transfer to a third computing system, wherein the data identifying the file transfer includes the global context ID.

In yet another aspect, disclosed herein is a first computing system that includes a network interface for communicating over at least one data network, at least one processor, at least one non-transitory computer-readable medium, and program instructions stored on the at least one non-transitory computer-readable medium that are executable by the at least one processor to cause the first computing system to carry out the functions disclosed herein, including but not limited to the functions of the foregoing method.

In still another aspect, disclosed herein is a non-transitory computer-readable medium provisioned with program instructions that, when executed by at least one processor, cause a first computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 5A depicts a simplified block diagram of a file transfer between two computing systems including data content for aggregated transactions.

FIG. 5B depicts an example representation of a comprehensive span for a distributed transaction.

FIG. 5C depicts another example representation of a comprehensive span for a distributed transaction.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Distributed Computing Platform

Many types of modern financial transactions are carried out via distributed financial computing platforms. As one example, an end-to-end transaction related to a just a single consumer credit card purchase may implicate numerous distinct services hosted by a distributed financial computing platform, such as an authorization service, a credit provider service, a service for assessing provider fees, a service for settling payments, a service for running an audit report, and so on. In this regard, an end-to-end transaction of this kind may also be referred to herein as a distributed transaction. Numerous other types of financial transactions may be executed in a similar way, through the collective action of many separate services.

Figure 1:
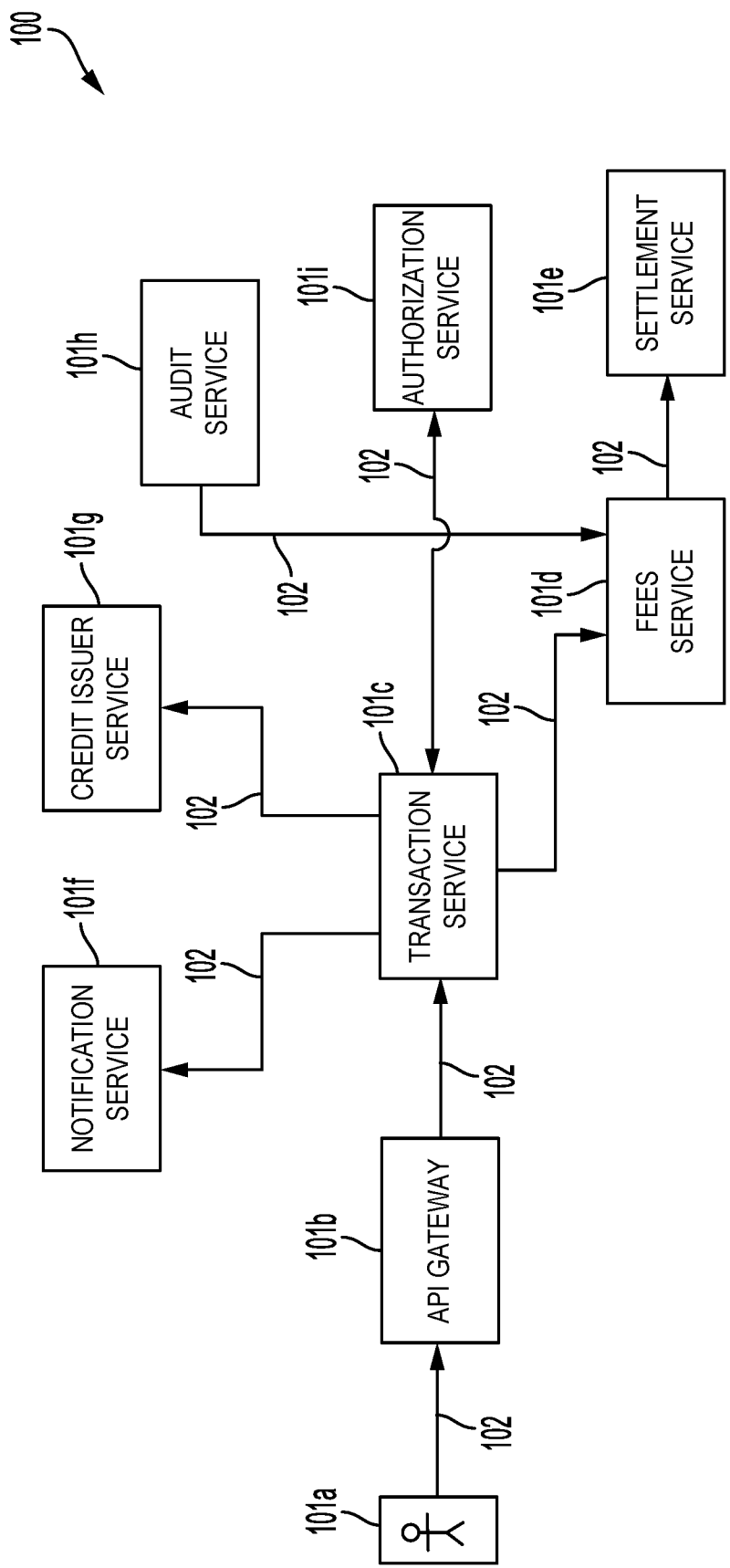
FIG. 1 is an example logical architecture diagram of distributed computing platform for facilitating financial services.

A simplified example of this type of distributed financial computing platform is shown in FIG. 1, which depicts a logical architecture diagram of a computing platform 100 that may be associated with processing financial transactions. At a high level, computing platform 100 may generally comprise one or more software subsystems 101 (identified individually as subsystems 101a-101i) and one or more communication links 102, each of which may take various forms.

For instance, the software subsystems of computing platform 100 may each be configured to provide a specific service related to a given distributed transaction. Thus, subsystem 101a may perform a first set of functions to facilitate a first service related to the distributed transaction. Subsystem 101b, which may be downstream of subsystem 101a, may perform a second set of functions to facilitate a second service related to the distributed transaction, and so on. Further, each software subsystem may include a network-accessible interface that allows other subsystems to access it over a network. A given subsystem's network-accessible interface may take various forms, such as an application programming interface (API), among other possibilities depending on the implementation.

Communication links 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication link 102 may be wireless, wired, or some combination thereof, and may carry data according to any of various different communication protocols, such as hypertext transfer protocol (HTTP), advanced message queueing protocol (AMQP), message queueing telemetry transport (MQTT), among other possibilities.

In practice, the computing platform 100 may be implemented using various different techniques. For example, the computing platform 100 may be implemented in part using a service-oriented architecture (SOA) where one or more of the subsystems communicate via an enterprise service bus (ESB). As another example, the computing platform 100 may be implemented in part using a microservices architecture where one or more of the subsystems are deployed in containers and communicate using respective APIs. As yet another example, one or more of the subsystems shown in FIG. 1 may utilize a serverless architecture where the given subsystem is implemented as a set of cloud-based functions that may only be run when another subsystem accesses its API. As suggested above, the computing platform 100 may integrate aspects of any of these various architectures, among others, in any combination.

The physical instantiation of the subsystems hosted by the distributed computing platform 100 may also take various forms. In this regard, it should be noted that the physical hardware (e.g., servers, processors, communication interfaces, etc.) that makes up the subsystems of computing platform 100 might not be organized along the same lines as the logical architecture diagram shown in FIG. 1. For example, a given subsystem of the computing platform 100 may be collectively implemented by two or more physically distinct computing systems. Conversely, a single computing system might implement two or more logically separate subsystems (e.g., within separate containers or virtual machines) using the same physical hardware. Some of the structural components of the computing system(s) that might constitute the computing platform 100 are discussed further below in relation to FIG. 7.

When utilizing a distributed computing environment, such as the environment provided by computing platform 100 shown in FIG. 1, services that facilitate the ability to observe a distributed transaction that traverses several different subsystems can be useful for various purposes. For example, a complete collection of transaction event details (e.g., event logs) from each subsystem involved in handling the complete distributed transaction, sometimes referred to collectively as a trace, can be used to identify and resolve problems that may exist with an individual subsystem or a dependency between two or more subsystems. In this way, distributed transaction traces can be used to develop insights surrounding opportunities to improve the operation of a given subsystem, and thus the overall computing platform 100, among other possible benefits.

However, because the individual subsystems in computing platform 100 are loosely coupled without a centralized actor orchestrating an entire distributed transaction, each subsystem may have relatively little knowledge of the other subsystems. Further, the subsystems in computing platform 100 may process hundreds or thousands of transactions per day. Thus, it can be difficult to identify, from the perspective of any given subsystem, whether a set of functions performed by that subsystem (i.e., a first event) are associated with a set of functions performed by another subsystem (i.e., a second event), much less how a series of events that occurred across multiple different subsystems fit together into a single, end-to-end transaction.

Some efforts have been made in this regard to provide for transaction tracing within distributed computing environments. For example, in some modern computing platforms, the subsystem that initiates a new transaction may utilize a shared global context identifier (ID) for the transaction that is transferred with the relevant transaction data to the next downstream subsystem that is participating in the transaction, and so on. In this way, the global context ID may be propagated across all participating subsystems such that all events related to the transaction (e.g., the functions performed by each subsystem) are associated with the same global context ID and can thereby be correlated and assembled into a complete transaction trace.

Currently, the pattern and implementation for sharing this type of global context ID for transactions spanning loosely coupled subsystems of a distributed computing platform has only been defined for communications using hypertext transfer protocol (HTTP). Similar work is being undertaken to define a pattern and implementation for sharing this type of global context ID alongside transaction data that is communicated using some message queue-based protocols, such as advanced message queueing protocol (AMQP) and message queueing telemetry transport (MQTT). Nonetheless, distributed tracing of global context identifiers using these types of communication protocols remains a known problem today.

Moreover, these are not the only communication protocols that are used to relay transaction data between subsystems in a distributed computing platform. In particular, many types of financial computing platforms, such as computing platform 100, commonly carry out communications between subsystems using a file transfer protocol. For instance, a first subsystem may write data content related to a given transaction to a file that is stored on a local filesystem, such as a batch (.bat) file, a comma-separated value (.csv) file, an extensible markup language (.xml) file, among other possibilities. This file may then be transferred to a second subsystem, which may read the data content in the file and perform additional functions.

However, no solution exists or has been proposed for propagating a global context ID when communications are carried out via file transfer. Consequently, any subsystems that participate in a distributed transaction after a file transfer event cannot be correlated with those that participated prior to the transfer. Trace continuity is lost at the file transfer point, and with it the ability to observe the entire distributed transaction.

Figure 2:
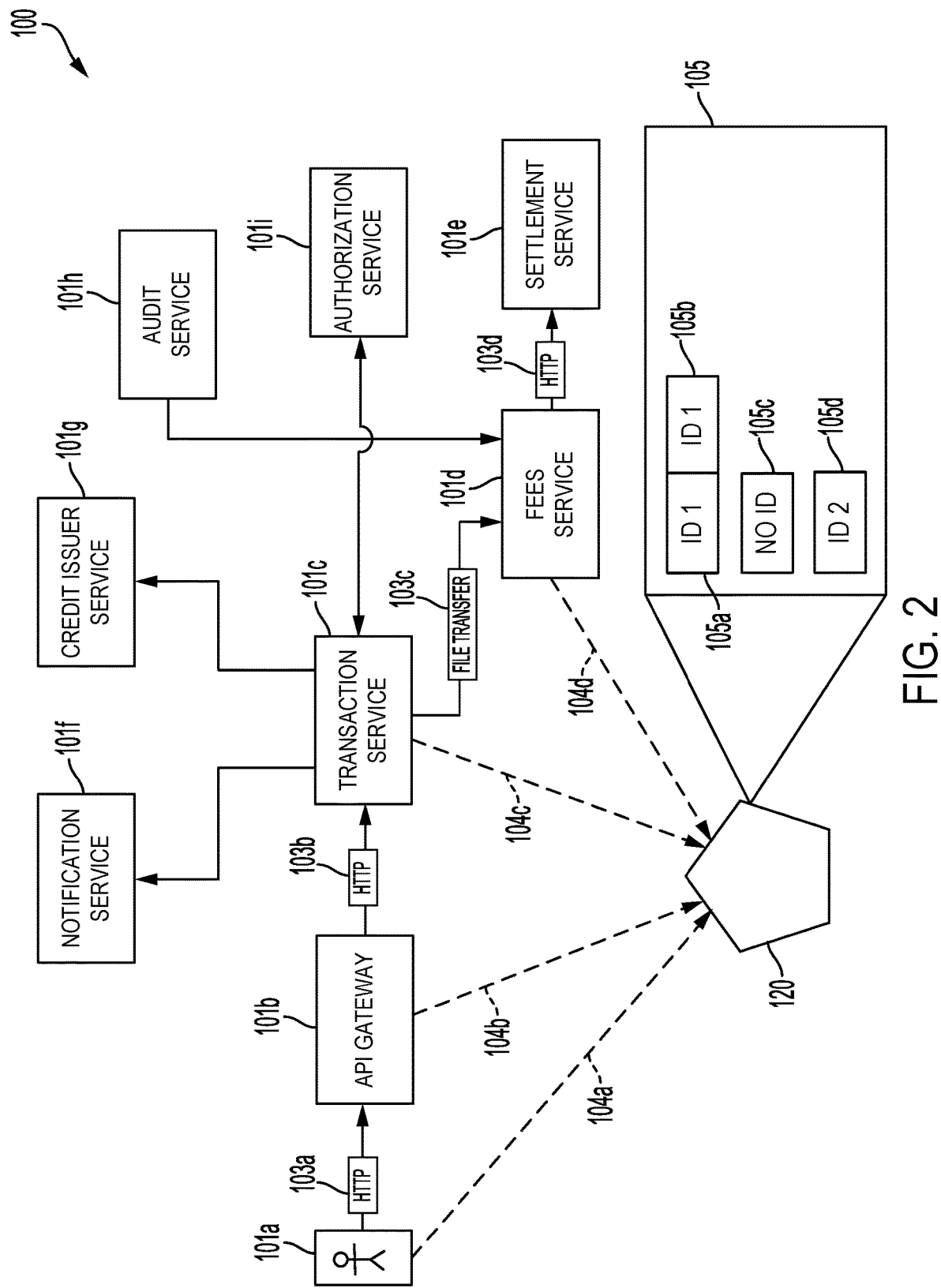
FIG. 2 depicts an example of the distributed computing platform of FIG. 1 in communication with a transaction tracing system.

FIG. 2 illustrates an example of the problem discussed above. As shown in FIG. 2, the subsystems of the computing platform 100 are in communication with a computing system 120 that facilitates a transaction tracing service. In this regard, the computing system 120 collects metadata related to events processed by the subsystems of computing platform 100, analyzes and organizes the events, and then presents correlated events (e.g., via a dashboard) as a complete transaction trace. The complete set of events making up the transaction can then be analyzed as a whole to identify issues and improve the operation of a given subsystem and/or the overall platform.

To facilitate the collection of such data by the computing system 120, each subsystem in computing platform 100 may include a software component, also referred to as an agent, that is associated with the computing system 120. After a given subsystem performs one or more functions related to a given transaction (e.g., a transaction event), the subsystem will transmit, via the agent, metadata regarding the event to the computing system 120, including the global context ID associated with the transaction.

In FIG. 2, for purposes of illustration, the computing platform 100 takes the form of a platform for processing credit card payments. For instance, subsystem 101a may represent a credit card access point associated with a merchant, which may receive data content related to a payment made with a consumer credit card. Subsystem 101a may transmit data content related to the payment to subsystem 101b in the form of an HTTP message 103a. Subsystem 101b may represent an API gateway that facilitates receiving credit card transaction requests over the Internet and may relay the data content related to the credit card transaction to subsystem 101c in the form of another HTTP message 103b.

Subsystem 101c may represent a transaction service for routing data content related to transactions to various other subsystems of the computing platform 100. In some cases, subsystem 101c may aggregate data content related to multiple consumer credit card payments, made at various different times, perhaps at various different merchants, before sending such data on to other subsystems of the computing platform 100 in the form of a file. For example, subsystem 101c may write a batch file to its local file system that contains the aggregated data content and then facilitate a file transfer 103c of the batch file to subsystem 101d using a file transfer protocol.

Subsystem 101d may represent a fees service that receives the file transfer, reads the data content from the batch file, and then calculates and assesses fees for the parties involved (e.g., the merchant) in each transaction. This data content may then be transmitted to subsystem 101e in the form of an HTTP message 103d. Subsystem 101e may take the form of a settlements service, which may facilitate final payment by a credit issuer, to the merchant, for the consumer credit card purchase (e.g., less the merchant fees).

Although the example data content transferred and the example functions performed by subsystems 101a-101e discussed above will be referred to hereafter for purposes of illustration, it will be appreciated that numerous other subsystems of computing platform 100, such as subsystems 101f, 101g, 101h, 101i may be involved in the example transaction discussed above, as well as other subsystems that are not shown in FIG. 2 for the sake of clarity. Similarly, numerous additional communications that would be associated with the example transaction have also been omitted for the sake of clarity. As just one example, subsystem 101i may represent an authorization service that receives an initial query to confirm the authenticity of the credit card purchase. Once confirmed, it may authorize the purchase via a return message to subsystem 101a.

Referring now to the computing system 120, FIG. 2 illustrates the metadata sent by the respective agent at each of the subsystems 101a-101d that handled the transaction discussed above. For instance, the subsystem 101a may transmit one or more logs 104a including data describing the functions the subsystem 101a performed with respect to the transaction, such as transmission of the HTTP message 103a. Further, the one or more logs 104a may include the global context ID (e.g., "ID 1") that the subsystem 101a associated with the transaction, and may indicate that the HTTP message 103a included the global context ID for use by the subsystem 101b.

In turn, the subsystem 101b may similarly transmit one or more logs 104b to the computing system 120, including data regarding the functions the subsystem 101b performed with respect to the transaction. As above, the one or more logs 104b may include data regarding transmission of the HTTP message 103b, including the same global context ID, to subsystem 101c.

Subsystem 101c may initially transmit one or more logs 104c to the computing system 120 indicating that the subsystem 101c received the HTTP message 103b from subsystem 101b, which included the global context ID. However, when the subsystem 101c writes the aggregated data content to a batch file, as discussed above, the data content loses its association with the global context ID because there is no mechanism in place to associate the global context ID with the batch file. Consequently, when the subsystem 101c transmits one or more logs 104c to the computing system 120 to report the functions it performed in relation to the transaction, the global context ID received in HTTP message 103b from subsystem 101b is not among the included data, nor is there any global context ID associated with the file transfer 103c.

Subsystem 101d receives the file transfer 103c and may perform additional functions related to the data content contained therein, as discussed above. Then, after transmitting the HTTP message 103d to subsystem 101e, subsystem 101d may transmit one or more logs 104d to the computing system 120, including data regarding the functions the subsystem 101d performed with respect to the transaction. But because the incoming file transfer 103c did not include a global context ID, subsystem 101d is unaware that the functions it performed and the outgoing HTTP message 103d are associated with a previously ongoing transaction. Thus, the HTTP message 103d might also lack an indication of a global context ID. As another possibility, which is reflected in FIG. 2, the subsystem 101d may assign a new global context ID (e.g., "ID 2") to the HTTP message 103d, since it otherwise appears, from a tracing standpoint, to be the beginning of a new transaction.

The effect of these shortcomings can be seen in the output that is generated by the computing system 120, which is visually demonstrated in FIG. 2. For instance, the computing system 120 may present data related to distributed transaction traces in a dashboard 105, which may be viewed at a client station associated with the computing system 120. The dashboard 105 may take various forms and may include various information related to the event logs collected by the computing system 120. As one possibility, the computing system 120 may present a diagram of the events that make up a distributed transaction, which may be represented as spans. In this regard, a given span may mark the exit from, and entry into, different subsystems of the computing platform 100, and may indicate the global context ID that was associated with the transaction event by the respective subsystem. Each span may also be associated with additional metadata (not shown) related to the transaction event, such as a datestamp, timestamp, a record of other functions performed by the subsystem related to the transaction, and so on.

For instance, based on the information received by the computing system 120 in the one or more logs 104a, the dashboard 105 may represent the transmission of HTTP message 103a in the example transaction discussed above as span 105a, which is associated with the global context identifier "ID 1." In a similar way, based on the information received by the computing system 120 in the one or more logs 104b, the dashboard 105 may represent the transmission of HTTP message 103b as span 105b, which is also associated with the global context identifier "ID 1." Consequently, as shown in FIG. 2, the computing system 120 may correlate spans 105a and 105b based on their matching global context ID into a combined span (sometimes referred to as a parent span or a root span) that includes both transaction events.

However, because the information received in the one or more logs 104c related to the file transfer 103c did not include the global context identifier "ID 1," as discussed above, the computing system 120 is unable to correlate the corresponding span 105c representing the file transfer with the prior spans 105a and 105b. Indeed, the computing system 120 may be unable to correlate span 105c with any other transaction events because the file transfer 103c was not associated with any global context ID.

In addition, the information received by the computing system 120 in the one or more logs 104d may indicate that the HTTP message 103d is associated with a new global context identifier "ID 2" that was assigned by subsystem 101d, as discussed above. Thus, the dashboard 105 may represent the transmission of HTTP message 103d as span 105d, which is associated with the global context identifier "ID 2." Although further downstream transaction events (e.g., an HTTP message emitted by subsystem 101e, not shown) might be correlated with the new global context identifier "ID 2," trace continuity for the transaction that began at subsystem 101a has nonetheless been lost. As can be seen in FIG. 2, the individual spans that make up the entire distributed transaction are fragmented into at least three separate parts that cannot be correlated using one, or even two, global context IDs. Consequently, the computing system 120 cannot assemble a continuous trace for the entire distributed transaction, making it difficult to observe, analyze, and/or troubleshoot these types of transactions that traverse the computing platform 100.

In view of these and other shortcomings associated with propagating global context identifiers in a distributed computing platform, disclosed herein are new techniques whereby a first subsystem participating in a distributed transaction is configured to embed a global context identifier alongside data content that is to be transmitted to a second subsystem using a file transfer communication. In turn, the second subsystem that receives the file transfer may be configured to extract the global context identifier from the file transfer and associate it with functions it performs, including further downstream transmission of data content as part of the distributed transaction.

Further, it should be noted that although the examples herein generally involve financial transactions and the computing platforms and services involved therewith, the techniques discussed may be applied to any type of distributed computing platform that uses file transfers for communications between subsystems.

These techniques may be implemented in various ways, some of which will be discussed below in connection with FIGS. 3A and 3B, which illustrate an enlarged schematic view of a file transfer between a first subsystem and a second subsystem. For instance, in the examples that follow, the first subsystem may be the subsystem 101c and the second subsystem may be the subsystem 101d shown in FIG. 2. According to one possible implementation, a software application running on the first subsystem 101c may be configured to monitor the first subsystem 101c for an indication that a file transfer communication is to be executed. In this regard, the first subsystem 101c may include one or more software components, such as an agent associated with a transaction tracing service, that carries out one or more of the operations discussed here.

The indication that a file transfer communication is to be executed may take various forms. As one example, the first subsystem 101c (e.g., the agent operating on the first subsystem) may monitor the first subsystem 101c for a command to write a file to a designated location within the file system of the first subsystem 101c. The designated location may be a particular folder, drive, or other identifiable location within the data storage of the first subsystem 101c from which outbound file transfer communications are executed. Thus, a file transfer may be initiated by the first subsystem 101c by writing a file to the designated location.

In some cases, the command to write the file may take the form of a command to generate a new file containing data content that is currently stored at the first subsystem 101c, but in a different format (e.g., as HTTP message content). Thus, the command to write the file may be a command for the first subsystem 101c to aggregate the stored data content into a single file and to write the file to the designated location on the file system of the first subsystem 101c.

Alternatively, a file containing the data content that is to be transferred to the second subsystem 101d may already be stored on the first subsystem 101c at the time the command to write the file to the designated location is detected. Thus, the command to write the file to the designated location may take the form of a command to move or copy the file from its current location on the file system to the designated location from which file transfers are executed.

Other indications that a file transfer is to be executed from the first subsystem 101c to the second subsystem 101d are also possible, including other types of commands that may be carried out by the first subsystem 101c in advance of the file transfer. The first subsystem 101c may be additionally or alternatively configured to look for these types of indications as well.

The first computing system 101c may also be configured to determine a global context ID for association with the file transfer. The determination of a global context ID for association with the file transfer may take various forms. As one possibility, the first subsystem 101c may determine that the file transfer, when executed, will be a part of an ongoing distributed transaction that began upstream of the first subsystem 101c. For instance, the data content that is to be included in the file transfer may have been received in one or more incoming messages (e.g., HTTP messages) from one or more upstream subsystems as part of the ongoing distributed transaction. Each of these messages, in turn, may have included a respective global context ID that was associated with the message, and the first subsystem 101c may be configured to extract the existing global context ID when it receives and/or processes the incoming message. This global context ID may then be used by the first subsystem 101c for association with the file transfer.

As another possibility, the first subsystem 101c may determine that the file transfer will be the first event in a new distributed transaction. In this situation, the first subsystem 101c may generate a new global context ID that will be associated with the file transfer and thereby transmitted to the second subsystem 101d. The first subsystem 101c may determine a global context ID for association with the file transfer in other ways as well.

After the global context ID is determined, and based on detecting the indication that the file transfer is to be executed, (e.g., by detecting a write file command), the first subsystem 101c may associate the determined global context ID with the file transfer. In this way, when the file including the data content related to the distributed transaction is transferred to the second subsystem 101d, the global context ID is transferred with it.

The first subsystem 101c may associate the global context ID with the file that is to be transferred in various ways. At a high level, the global context ID may be associated with the file in such a way that segregates it from the data content in the file that is related to the distributed transaction. For instance, the global context ID may be contained within a data element that is associated with the file but is nonetheless isolated form the data content of the file. This may allow a software application running on the second subsystem 101d (e.g., another agent of the transaction tracing service) to extract the global context ID without having to parse the data content in the file related to the distributed transaction. Similarly, other components of the second subsystem 101d that read the data content of the file and perform further functions related to the distributed transaction may do so without needing to parse the global context ID.

Figure 3A:
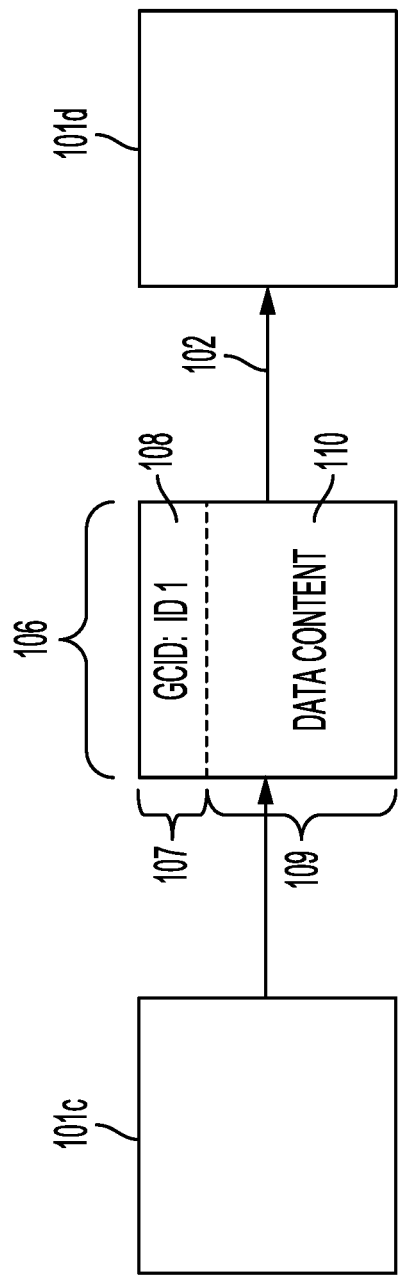
FIG. 3A depicts a simplified block diagram of a file transfer between two computing systems.

FIG. 3A illustrates one possible implementation for associating a data element containing the global context ID with a file such that the data element is isolated from the data content of the file. As shown in FIG. 3A, the first subsystem 101c may execute a file transfer of a file 106 that includes data content 110 related to a distributed transaction. However, prior to the file transfer, the first subsystem 101c may embed into the file 106 a data element 107 that is separate from the data content 110 and contains a global context ID 108. In this regard, the data element 107 may take the form of a comment or the like that is used to isolate information from the remainder of the file 106, which is shown in FIG. 3A as a separate portion 109 that includes the data content 110.

As discussed above, the file 106 may take various forms and may have various different formats. Accordingly, the manner in which the first subsystem 101c embeds the data element 107 into the file 106 may also take various forms, depending on the given file type. For instance, in a JavaScript Object Notation (.json) file, the data element 107 may take the form of .json snippet within a .json comment. Numerous other examples are also possible.

The first subsystem 101c may embed the data element 107 into the file 106 at various different times prior to the execution of the file transfer. In some implementations, the agent of the transaction tracing service that is running on the first subsystem 101c may intercept the write file command to create the file 106 in order to inject instructions for including the data element 107 into the command. Thus, the file 106 may be written (e.g., written to a designated location on the file system of the first subsystem 101c) with the data element 107 already embedded (e.g., as a comment). In some other implementations, the agent may identify the write file command for file 106, but may wait until the command is executed and then update the now-written file 106 to embed the data element 107. Other implementations are also possible.

Within the data element 107, the global context ID 108 may be formatted in a standardized way, which may facilitate identification and extraction of the global context ID 108 by the second subsystem 101d when it receives the file transfer. For instance, the global context ID 108 may be represented in the data element 107 according to an attribute/value pair syntax. As shown in the example of FIG. 3A, the attribute "GCID" within the data element 107 may identify the presence of the global context ID 108, which has a value of "ID 1." The global context ID 108 may be represented in other formats as well.

It should be noted that, although the current example involves an example file transfer that is associated with a single global context ID 108, it is also possible that a single file (e.g., a batch file, a .csv file, etc.) that is transferred via a file transfer communication might include aggregated data content relating to multiple different distributed transactions, as suggested above. Thus, the file transfer of the aggregated data content might be associated with multiple different global context IDs (including a global context ID that identifies the aggregated data content), and might ultimately be linked with each of the different distributed transactions. In this situation, the data element 107 may include each of global context IDs arranged in an array, a list, or the like. Examples involving a file transfer that includes aggregated data content will be discussed further below in connection with FIGS. 5A-5C.

After the data element 107 is embedded in the file 106, the first subsystem 101*c* may execute the file transfer by transmitting the file 106 to the second subsystem 101*d* over a communication link 102. The file transfer may be executed in various ways, including by file transfer protocol (FTP), SSH file transfer protocol (SFTP), among numerous others. In FIG. 3A, the file transfer between the first subsystem 101*c* and the second subsystem 101*d* is illustrated as a point-to-point transfer, however, other implementations are also possible. For instance, the file transfer may be facilitated by a file transfer orchestrator system, an example of which will be discussed further in connection with FIG. 3B.

After executing the file transfer, the first subsystem 101*c* may transmit data identifying the file transfer to a transaction tracing system, such as the computing system 120 shown in FIG. 2. However, unlike the example discussed above with respect to FIG. 2, the data that is sent to the computing system 120, which may take the form of log 104*c*, now includes the global context ID 108. Accordingly, the computing system 120 may now correlate the file transfer 103*c* with both upstream and downstream events related to the distributed transaction.

Execution of the file transfer may be complete when the file 106 is written to the file system of the second subsystem 101*d*, such as a designated location on the file system of the second subsystem 101*d* for receiving file transfers. In this regard, the second subsystem 101*d* may include a software application that acts as an agent for the computing system 120 and monitors the second subsystem 101*d* for an indication of an incoming file transfer in order to extract the global context ID therefrom.

After the incoming file transfer is detected, the second subsystem 101*d* may identify the data element 107 within the file 106. For instance, the agent of the second subsystem 101*d* may be configured to recognize comments and the like within various different types of files. Further, the second subsystem 101*d* may read the contents of the data element 107 and identify the global context ID 108 therein based on the standardized format of its attribute/value pair syntax. In turn, the second subsystem 101*d* may extract the global context ID 108 from the data element 107. Thereafter, the second subsystem 101*d* may transmit the global context ID 108 along with data it sends to the computing system 120 related to the file transfer, including data related to any additional functions second subsystem 101*d* performs in relation to the data content 110.

Figure 3B:
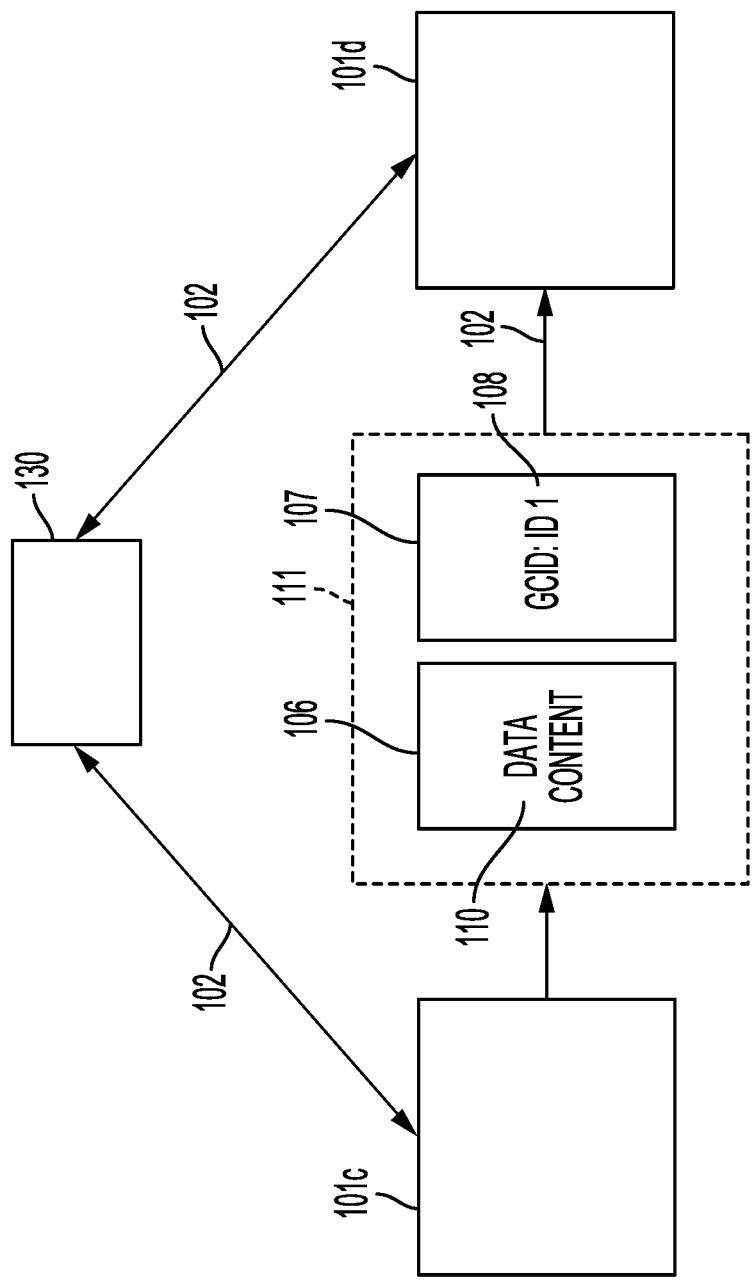
FIG. 3B depicts another simplified block diagram of a file transfer between two computing systems.

Turning to FIG. 3B, another possible implementation is illustrated for associating a data element containing the global context ID with a file such that the data element is isolated from the data content of the file. As shown in FIG. 3B, instead of embedding the data element 107 into the file 106 as shown in FIG. 3A, the data element 107 may take the form of a separate, companion file that is written by the first subsystem 101*c*. For instance, the data element 107 in FIG. 3B may take the form of a text file or other similar file type and may include the global context ID 108. In some implementations, the data element 107 may have a known file type and file extension (e.g., a .txt file). In other implementations the data element 107 may have a specialized file type and file extension that is only used for transaction tracing purposes (e.g., a .trace file). Other examples are also possible.

Whatever its format, the data element 107 contains the global context ID 108 and is isolated from the data content 110 in the file 106, as above. Further, the data element 107 may be associated with the file 106 because it is included in the same file transfer payload as the file 106. As can be seen in FIG. 3B, the file transfer payload 111 is illustrated by the dashed line and includes both the file 106 and the data element 107 as separate files. Within the data element 107, the global context ID 108 may be formatted in a standardized way, as described above with respect to FIG. 3A.

The first subsystem 101*c* may write the file represented by data element 107 at various different times prior to the execution of the file transfer. For instance, the agent of the transaction tracing service that is running on the first subsystem 101*c* may identify the write file command to create the file 106 and may generate an additional command to write the data element 107 in parallel to the write command for the file 106. Thus, the file 106 and the data element 107 may be written (e.g., written to a designated location on the file system of the first subsystem 101*c*) at approximately the same time. Other implementations are also possible.

After the file 106 and the data element 107 are written to the file system of the first subsystem 101*c*, the first subsystem 101*c* may execute the file transfer by transmitting the file transfer payload 111 to the second subsystem 101*d* over a communication link 102. In the example shown in FIG. 3B, the file transfer may be facilitated in part by a file transfer orchestrator system, represented by computing system 130, that is in communication with the first subsystem 101*c* and the second subsystem 101*d* via communication links 102.

The computing system 130 may orchestrate the file transfer in various ways. For instance, the computing system 130 may monitor the first subsystem 101*c* to determine that one or more files have been written to a designated location on the file system of the first subsystem 101*c*, confirm that the second subsystem 101*d* is ready to receive the file transfer at a designated location on its file system, and then schedule the file transfer for execution by the first subsystem 101*c*. As another possibility, the computing system 130 may similarly monitor the first subsystem 101*c*. However, after determining that one or more files have been written to a designated location on the file system of the first subsystem 101*c*, the computing system may copy the one or more files (e.g., to a temporary storage location on the computing system 130) and then write them to the designated location on the second subsystem 101*d*. Various other implementations are also possible including combinations of the above.

Similar to the example shown in FIG. 3A, the second subsystem 101*d* may identify the data element 107 within the file transfer payload 111. For instance, the agent of the second subsystem 101*d* may be configured to recognize the presence of files within a file transfer payload that have a given file extension. The second subsystem 101*d* may read the contents of any such files, such as data element 107, and identify the global context ID 108 therein based on the standardized format of its attribute/value pair syntax. As above, the second subsystem 101*d* may extract the global context ID 108 from the data element 107.

After executing the file transfer, the first subsystem 101*c* may transmit data identifying the file transfer to the computing system 120 shown in FIG. 2. Similar to the example shown in FIG. 3A, the data now includes the global context ID 108. Accordingly, the computing system 120 may now correlate the file transfer 103*c* with both upstream and downstream events related to the distributed transaction.

Figure 4:
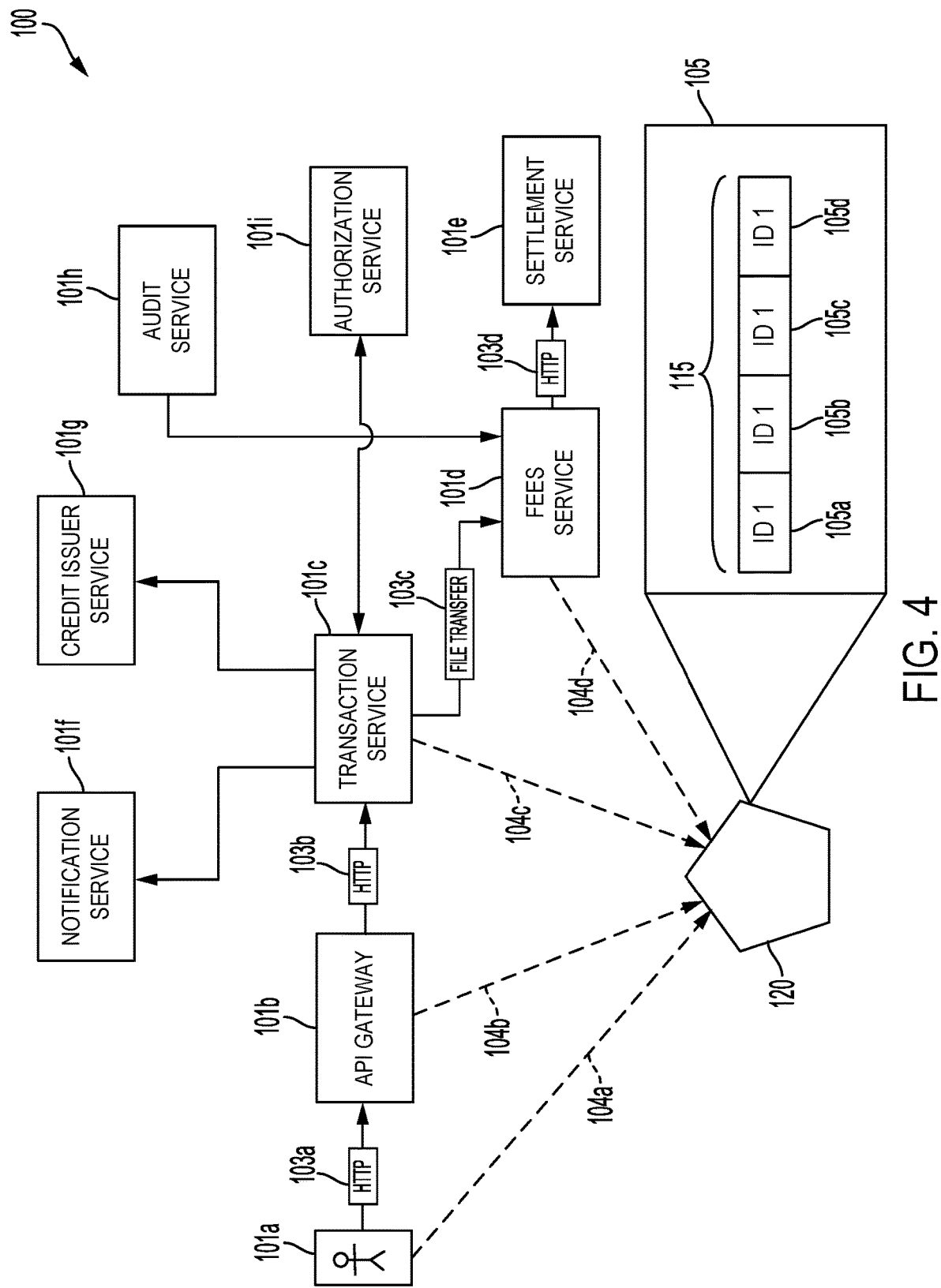
FIG. 4 depicts another example of the distributed computing platform of FIG. 1 in communication with a transaction tracing system.

FIG. 4 illustrates the effect of these improvements. In FIG. 4, the computing platform 100 and its member subsystems from FIG. 2 are again shown, along with the example distributed transaction discussed above that traverses subsystems 101*a*-101*d*. However, unlike in FIG. 2, the subsystem 101*c* shown in FIG. 4 was able to associate the global context identifier "ID 1" received in the HTTP message 103b with the subsequent file transfer 103c, and thus the global context identifier "ID 1" was propagated across all subsystems that participated in the transaction. This, in turn, is reflected in the data sent to the computing system 120 as logs 104a-104d. Consequently, the computing system 120 is now able to correlate each of the spans 105a-105d into a single, comprehensive span 115 that covers the entire distributed transaction. As discussed above, this can provide numerous benefits related to observation, analysis, and/or troubleshooting of the distributed transaction.

Turning now to FIG. 5A, an example file transfer is illustrated that includes data content for a plurality of individual transactions that have been aggregated together into a single file. As suggested above, one of the subsystems in the computing platform 100 may receive data content related to multiple different transactions. The subsystem may aggregate such data in the form of a single file before sending it on to other subsystems of the computing platform 100. In this regard, a subsystem that performs these actions may be referred to as an "aggregator." Further, the aggregator subsystem may be configured to collectively embed the individual global context identifiers associated with the individual transactions into the aggregated file, in order to maintain the trace continuity for each individual transaction that is aggregated.

For example, FIG. 5A illustrated an example in which a first subsystem 501c aggregates data content related to a plurality of distributed transactions into a single file 506. Thus, the file 506 includes data content 510 related to the plurality of distributed transactions (e.g., consumer credit card payments or the like, made at various different times, perhaps at various different merchants). For instance, the file 506 may be a .csv file (or the like) that includes data for each individual distributed transaction in a separate row. Further, the first subsystem 501c may be configured to extract the global context identifier for each of the individual transactions after they are received by the first subsystem 501c. For instance, the agent of the computing system 120 operating on the first subsystem 501c may be configured to extract the global context identifier from the individual, incoming messages for each transaction. Accordingly, prior to the file transfer, the first subsystem 501c may embed into the file 506 a data element 507 that is separate from the data content 510 and contains the respective global context identifiers 508b corresponding to each of the individual transactions that have been aggregated.

Although the example shown in FIG. 5A involves embedding global context identifiers into the file 506, as generally discussed above in relation to FIG. 3A, it should be understood that a similar approach may be taken whereby the data element 507 takes the form of a separate, companion file, as shown in FIG. 3B.

As the aggregator of data content corresponding to multiple individual transactions, the subsystem 501c may also generate a new global context identifier that corresponds to the aggregated data content as a whole, and is linked to the global context identifiers for each individual transaction. The new global context identifier for the aggregated data content may be linked with the global context identifiers for each individual transaction in various ways. For instance, in FIG. 5A, each of the individual global context identifiers 508b (e.g., "ID 1," "ID 2," "ID 3," . . . "ID N") may be designated as a sub-identifier that is nested below a new global context identifier 508a, such as "ID 100." Other examples are also possible. Further, when the subsystem 501c transmits data to the computing system 120 describing the functions subsystem 501c performed with respect to each of the aggregated transactions, the data may include an indication of the new global context identifier "ID 100" as well as an indication of the link between it and each individual global context identifier.

Similar to FIG. 3A above, the data element 507 may take the form of a comment or the like that is used to isolate information from the remainder of the file 506, which is shown in FIG. 5A as a separate portion 509 that includes the data content 510. As above, the file 506 may take various forms and may have various different formats. Accordingly, the manner in which the first subsystem 501c embeds the data element 507 into the file 506 may also take various forms, depending on the given file type.

Further, and similar to the discussion of FIG. 3A above, the new global context identifier 508a and the global context identifiers 508b for the individual transactions may be formatted in a standardized way (e.g., using a hierarchical arrangement, using a particular syntax, etc.) that facilitates not only their identification and extraction by a second subsystem 501d when it receives the file transfer, but also conveys the link between the two respective global context identifiers. Still further, the global context identifiers within the data element 507 may be arranged in a such a way that conveys the relationship between each individual global context identifier and the respective transaction data within the aggregated data content 510 to which it corresponds. For example, the aggregated data content 510 may be arranged in a .csv file or the like that includes that the data content for each individual transaction in a separate row—e.g., data for a first transaction in a first row, data for a second transaction in a second row, and so on. In turn, the global context identifiers 508b for the individual transactions may be nested beneath the global context identifier 508a in a corresponding list or similar data structure, such that the first global context identifier in the list is "ID 1," the second global context identifier is "ID 2" and so on. Thus, a downstream subsystem that disaggregates the data content within the file 506 into individual distributed transactions (e.g., a "disaggregator") may extract the individual global context identifiers from the data element 507 and inject them into any downstream messages for the individual distributed transactions, such that a comprehensive parent span that covers each distributed transaction can be assembled.

In view of the above, it should be understood that in some implementations, a subsystem of the computing platform 100, such as subsystem 501d shown in FIG. 5A, may receive a file transfer that includes aggregated transaction data, perform one or more operations related to the aggregated transaction data without disaggregating it, and then transmit the still-aggregated data content (including the data element 507 as shown in FIG. 5A) to another subsystem via another file transfer, which may disaggregate the data. In these situations, because the subsystem 501d only performed operations on the aggregated data and did not disaggregate the data content of the transferred file, it might only transmit an indication of the global context identifier "ID 100" to the computing system 120 for transaction tracing purposes. Nonetheless, because the computing system 120 received information indicating the link between "ID 100" and each of the individual global context identifiers from the upstream subsystem that aggregated the transaction data (e.g., subsystem 501c), the computing system 120 may still be capable of determining a single, comprehensive parent span for each individual distributed transaction within the aggregated transaction data, including operations performed by subsystems during which the individual transaction data was both aggregated and disaggregated.

FIGS. 5B and 5C collectively illustrate an example of how the computing system 120 may present the parent spans for two individual distributed transactions that were aggregated together as shown in FIG. 5A, and then later disaggregated. For instance, FIG. 5B illustrates a parent span 515a for a first distributed transaction that includes five individual spans—the first two of which indicate a global context identifier "ID 1." Similarly, FIG. 5C illustrates a parent span 515b for a second distributed transaction that also includes five individual spans—the first two of which indicate a global context identifier "ID 2." Following the first two individual spans of each transaction, a subsystem of the computing platform 100 (e.g., subsystem 501c) may aggregate the transaction data for the first and second distributed transactions into a single file, as discussed above with respect to FIG. 5A, and one or more downstream subsystems of the computing platform 100 may perform additional operations on the aggregated transaction data.

Accordingly, the parent spans 515a and 515b both include two individual spans that indicate a global context identifier "ID 100." As noted above, the computing system 120 is able to link these individual spans, which correspond to operations performed on the aggregated transaction data, with each of the individual parent spans 515a and 515b based on information received by the computing system 120 from the subsystem that aggregated the transaction data. Further, the same linking information may be used by the computing system 120 to correlate additional individual spans with both of the parent spans 515a and 515b after the transaction data has been disaggregated by another subsystem of the computing platform 100. As shown in FIG. 5B, the parent span 515a includes a fifth individual span that indicates the global context identifier "ID 1," and the parent span 515b shown in FIG. 5C similarly includes a fifth individual span that indicates the global context identifier "ID 2."

In still further implementations, a subsystem of the computing platform 100 might generate transaction data that is initially in aggregated state, such that the first operation that is carried out with respect to the transaction data, from a transaction tracing perspective, is performed on the transaction data in the aggregate. In such a situation, the aggregated transaction data might be initially associated with only a single global context identifier that corresponds to the aggregated data. In these implementations, a downstream subsystem of the computing platform 100 may eventually disaggregate the transaction data into separate, individual transactions, and in conjunction with the disaggregation, generate new individual global transaction identifiers for each individual transaction. Similar to example above, each of the new individual global transaction identifiers will be linked with the global context identifier that corresponds to the aggregated data. In this way, the computing system 120 is again able to determine a comprehensive parent span that correlates both the aggregated and disaggregated individual spans for each transaction.

Figure 6:
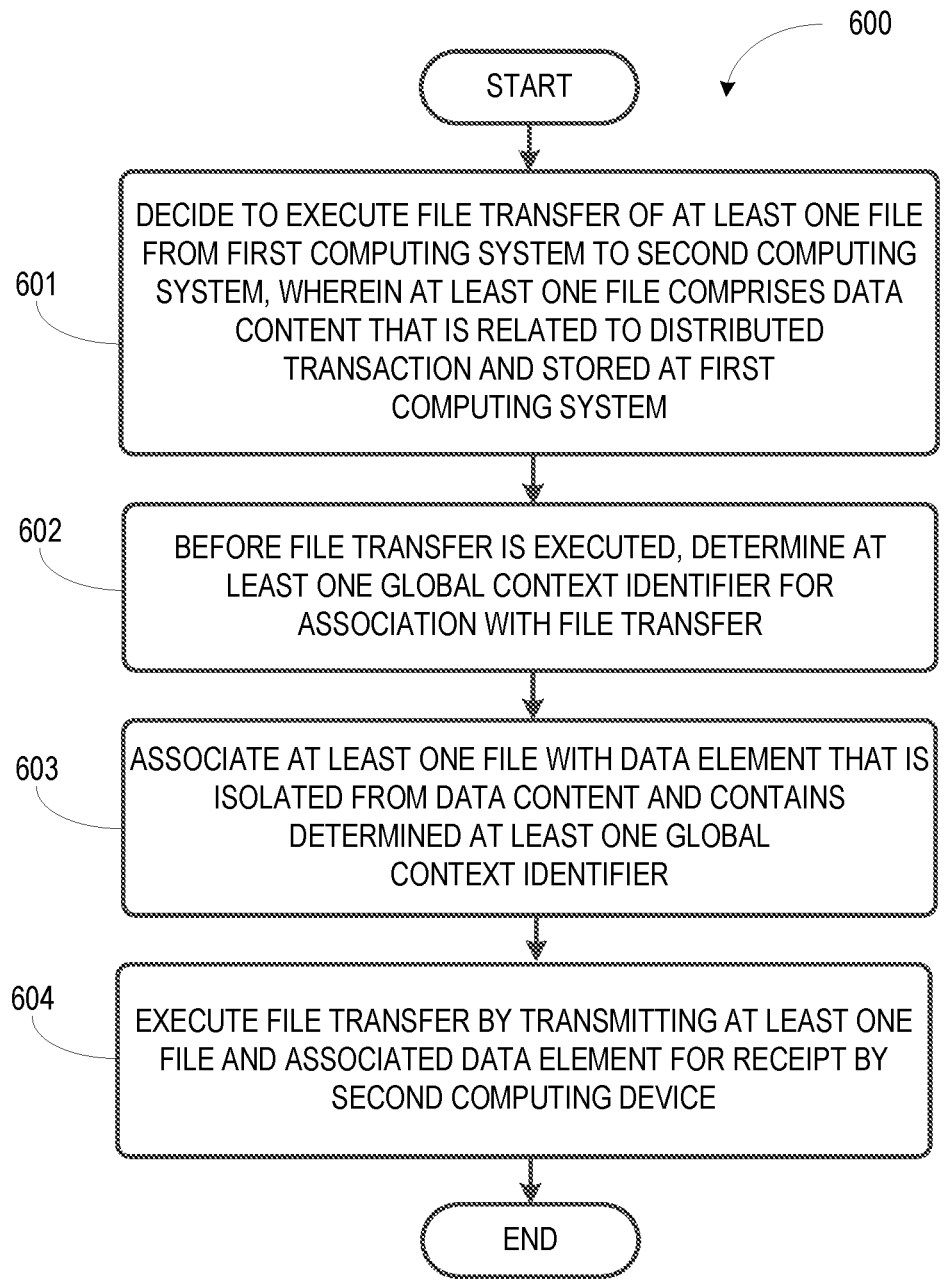
FIG. 6 is a functional block diagram that illustrates one example set of functions for sending a file transfer with a global context identifier.

Turning now to FIG. 6, a flowchart 600 is depicted that shows one example of the operations that may be carried out by a first computing system acting as the sender of a file transfer within a distributed computing platform. The first computing system may correspond to any one or more of the subsystems discussed above in relation to FIGS. 1-5A.

At block 601, the first computing system may decide to execute a file transfer of at least one file from the first computing system to a second computing system. The at least one file may be stored at the first computing system and may include data content that is related to a distributed transaction of which the file transfer will be a part.

At block 602, before the file transfer is executed, the first computing system may determine at least one global context identifier for association with the file transfer. In some cases, this may involve generating a new global context identifier, if the file transfer is to be the first event in a new distributed transaction. Alternatively, determining the global context identifier may involve identifying an existing global context identifier that the first computing system received from an upstream computing system (e.g., a third computing system) that handled the distributed transaction.

At block 603, the first computing system may associate the at least one file with a data element that is isolated from the data content and contains the determined global context identifier. The data element may take various forms, including a comment that is embedded into the file, as discussed above with respect to FIG. 3A. Alternatively the data element may take the form of an additional file that is paired with the file containing the data content, as discussed above with respect to FIG. 3B.

At block 604, the first computing system may execute the file transfer by transmitting the at least one file and the associated data element for receipt by the second computing system. In this way, the first computing system may enable the global context identifier to be correlated (e.g., by a transaction tracing service) with all events in a given distributed transaction that includes at least one file transfer communication, which has previously not been possible.

Figure 7:
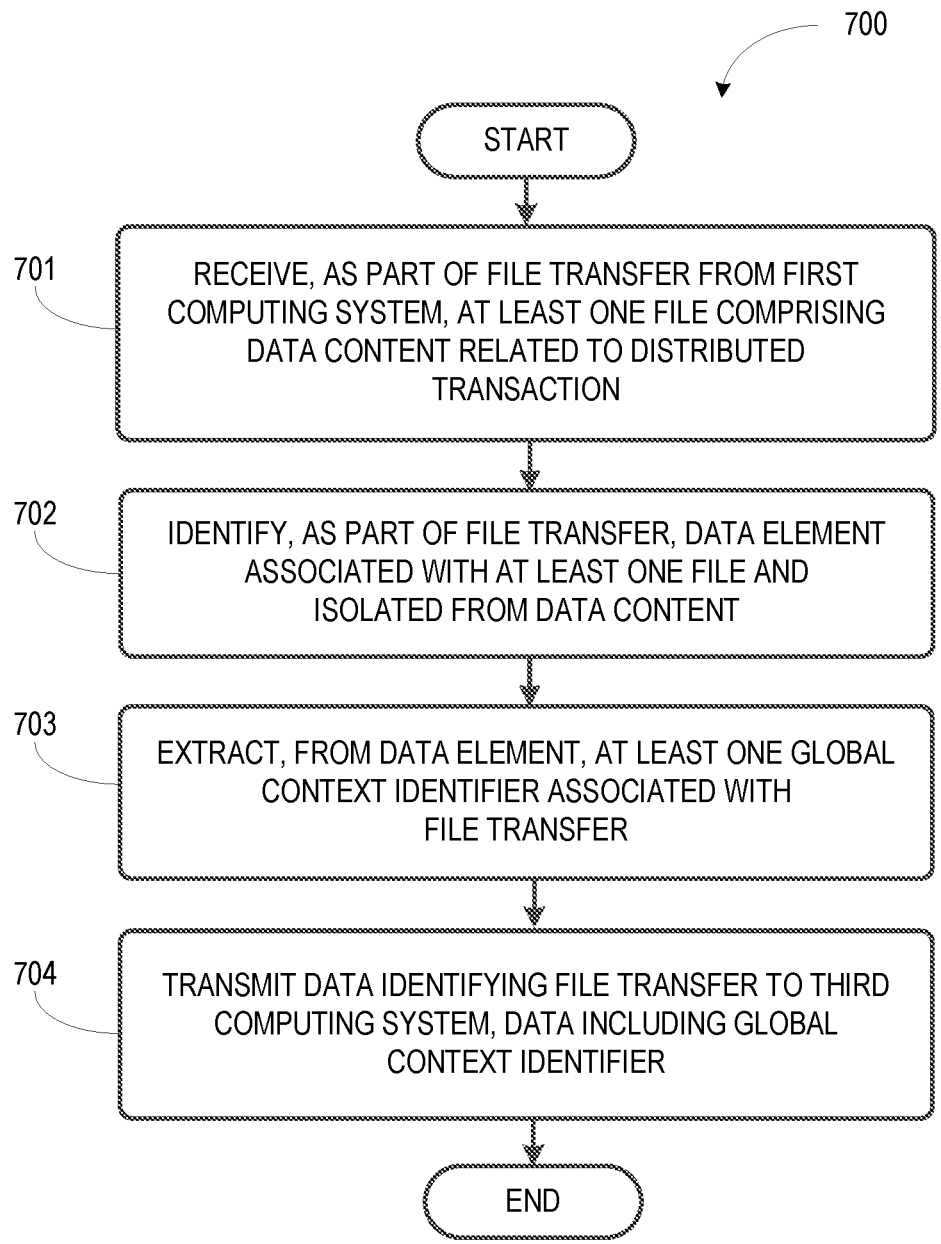
FIG. 7 is a functional block diagram that illustrates one example set of functions for receiving a file transfer that includes a global context identifier.

Turning to FIG. 7, a flowchart 700 shows one example of the operations that may be carried out by a second computing system acting as the receiver of a file transfer from a first computing system within a distributed computing platform. Similar to FIG. 6, the second computing system may correspond to any one or more of the subsystems discussed above in relation to FIGS. 1-5A.

At block 701, the second computing system may receive, as part of a file transfer from a first computing system, at least one file including data content that is related to a distributed transaction.

At block 702, the second computing system may identify, as part of the file transfer, a data element that is associated with the at least one file and isolated from the data content. As noted above, the data element may take various forms, including a comment within the at least one file or a separate file that is transmitted in conjunction with the file containing the data content, among other possibilities. The second computing system may be configured to recognize the data element, whatever its form, within the file transfer from the first computing system. Further, the second computing system may be configured to read the contents of the data element and further recognize a standard format in which the at least one global context identifier is expressed within the data element.

At block 703, the second computing system may extract, from the data element, the at least one global context identifier associated with the file transfer, enabling the second computing system to propagate the at least one global context identifier to downstream computing systems that may handle the distributed transaction.

At block 704, the second computing system may transmit data identifying the file transfer to a third computing system, where the data includes the at least one global context ID. For instance, the third computing system may facilitate a transaction tracing service, as discussed in the examples above.

FIGS. 6-7 include one or more operations, functions, or actions as illustrated by one or more of operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowcharts shown in FIGS. 6-7 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

Figure 8:
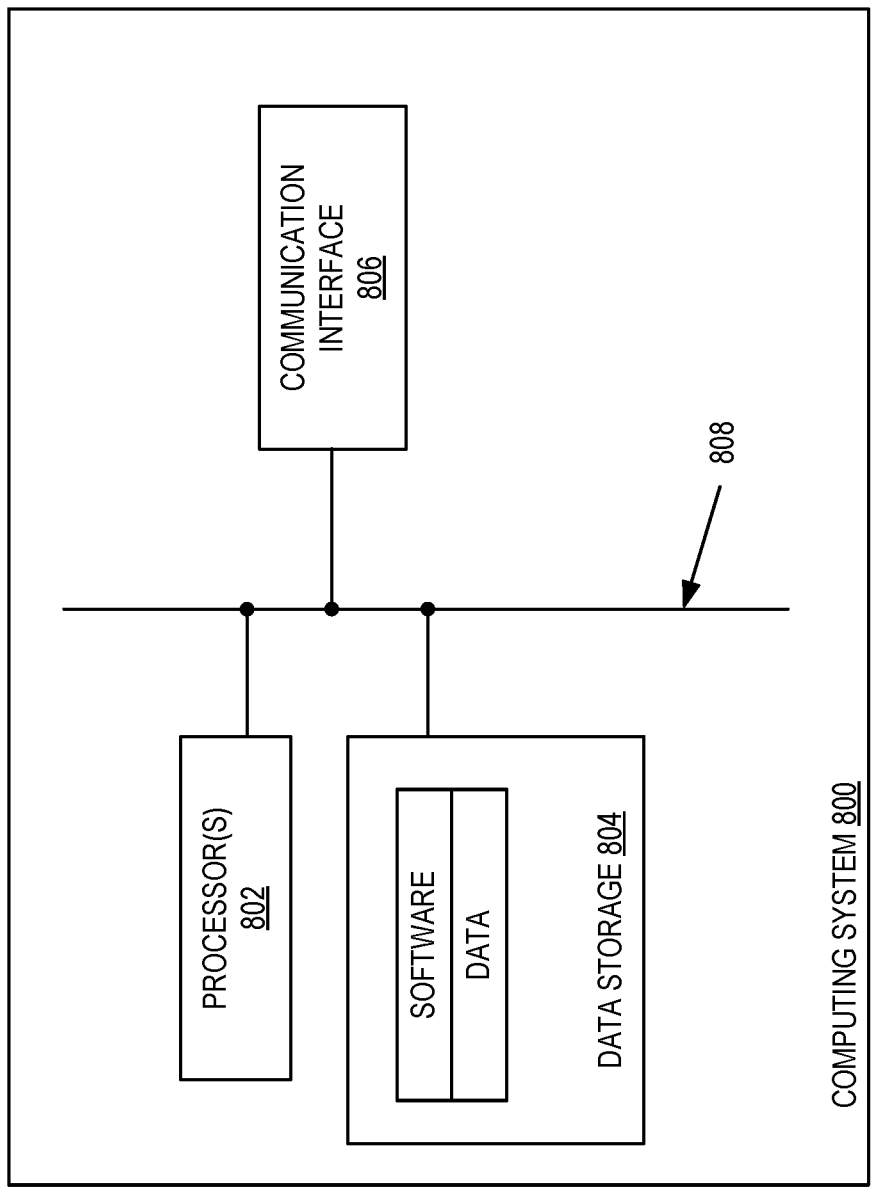
FIG. 8 is a simplified block diagram that illustrates some structural components that may be included in an example computing system.

Turning now to FIG. 8, a simplified block diagram is provided to illustrate some structural components that may be included in an example computing system 800. For example, computing system 800 may implement one or more of the software subsystems 101 shown in FIGS. 1-2 and may be configured to carry out any of the various subsystem functions disclosed herein—including but not limited to the functions included in the example data flows described with reference to FIGS. 6-7. At a high level, computing system 800 may generally comprise any one or more computer systems (e.g., one or more servers) that collectively include at least a processor 802, data storage 804, and a communication interface 806, all of which may be communicatively linked by a communication link 808 that may take the form of a system bus, a communication network such as a public, private, or hybrid cloud, or some other connection mechanism. Each of these components may take various forms.

For instance, processor 802 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 802 could comprise processing components that are distributed across a plurality of physical computing devices connected via a network, such as a computing cluster of a public, private, or hybrid cloud.

In turn, data storage 804 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 804 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 8, data storage 804 may be capable of storing both (i) program instructions that are executable by processor 802 such that the computing system 800 is configured to perform any of the various functions disclosed herein (including but not limited to any the functions described with reference to FIGS. 6-7), and (ii) data that may be received, derived, or otherwise stored by computing system 800. For instance, data storage 804 may encompass the file system of an example software subsystem discussed above and may store files that are transmitted and received via file transfer communications, among other possibilities.

Communication interface 806 may take the form of any one or more interfaces that facilitate communication between computing system 800 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

It should be understood that computing system 800 is one example of a computing system that may be used with the embodiments described herein. Numerous other arrangements are possible and contemplated herein. For instance, other computing systems may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

I claim:

1. A computing system comprising:
   a network interface for communicating over at least one data network;
   at least one processor;
   at least one non-transitory computer-readable medium; and
   program instructions stored on the at least one non-transitory computer-readable medium that are executable by the at least one processor such that the computing system is configured to:
     receive, from an upstream computing system, a message comprising data content that is related to a distributed financial transaction that spans at least the upstream computing system, the computing system, and a downstream computing system, the message comprising a global context identifier that identifies the distributed financial transaction;
     after receiving the message, (i) generate at least one file comprising the data content that is related to the distributed financial transaction, wherein the at least one file does not include the global context identifier, and (ii) store the at least one file at the computing system, decide to execute, as part of the distributed financial transaction, a file transfer of the at least one file from the computing system to the downstream computing system;

extract, from the message, the global context identifier;

before the file transfer is executed, generate a data element that comprises the global context identifier for association with the file transfer;

associate the at least one file with the data element such that the data element is isolated from the data content; and execute the file transfer by transmitting the at least one file and the associated data element for receipt by the downstream computing system.

2. The computing system of claim 1, wherein the program instructions that are executable by the at least one processor such that the computing system is configured to generate the at least one file comprise program instructions that are executable by the at least one processor such that the computing system is configured to:

after deciding to execute the file transfer, generate the at least one file comprising the data content that is related to the distributed financial transaction.

3. The computing system of claim 2, further comprising program instructions that are executable by the at least one processor such that the computing system is configured to:

monitor the computing system for an indication of a command to generate the at least one file comprising the data content that is related to the distributed financial transaction; and detect the command to generate the at least one file, wherein the program instructions that are executable by the at least one processor such that the computing system is configured to associate the at least one file with the data element comprise program instructions that are executable by the at least one processor such that the computing system is configured to associate the at least one file with the data element based on detecting the command to generate the at least one file.

4. The computing system of claim 3, wherein the program instructions that are executable by the at least one processor such that the computing system is configured to monitor the computing system for an indication of a command to generate the at least one file comprise program instructions that are executable by the at least one processor such that the computing system is configured to monitor the computing system for an indication of a command to generate the at least one file at a designated location on a file system of the computing system.

5. The computing system of claim 1, wherein the program instructions that are executable by the at least one processor such that the computing system is configured to associate the at least one file with the data element comprise program instructions that are executable by the at least one processor such that the computing system is configured to embed the data element into the at least one file.

6. The computing system of claim 1, wherein the at least one file is at least one first file, wherein the data element is at least one second file, and wherein the program instructions that are executable by the at least one processor such that the computing system is configured to associate the at least one file with the data element comprise program instructions that are executable by the at least one processor such that the computing system is configured to generate the at least one second file containing the global context identifier.

7. The computing system of claim 1, further comprising program instructions that are executable by the at least one processor such that the computing system is configured to:

after the file transfer is executed, transmit data identifying the file transfer to a computing system that is not spanned by the distributed financial transaction, wherein the data identifying the file transfer includes the global context identifier.

8. A non-transitory computer-readable medium, wherein the non-transitory computer-readable medium is provisioned with program instructions that, when executed by at least one processor, cause a computing system to:

receive, from an upstream computing system, a message comprising data content that is related to a distributed financial transaction that spans at least the upstream computing system, the computing system, and a downstream computing system, the message comprising a global context identifier that identifies the distributed financial transaction;

after receiving the message, (i) generate at least one file comprising the data content that is related to the distributed financial transaction, wherein the at least one file does not include the global context identifier, and (ii) store the at least one file at the computing system;

decide to execute, as part of the distributed financial transaction, a file transfer of the at least one file from the computing system to the downstream computing system;

extract, from the message, the global context identifier;

before the file transfer is executed, generate a data element that comprises the global context identifier for association with the file transfer;

associate the at least one file with the data element such that the data element is isolated from the data content; and execute the file transfer by transmitting the at least one file and the associated data element for receipt by the downstream computing system.

9. The computing system of claim 8, wherein the program instructions that, when executed by at least one processor, cause the computing system to generate the at least one file comprise program instructions that, when executed by at least one processor, cause the computing system to:

after deciding to execute the file transfer, generate the at least one file comprising the data content that is related to the distributed financial transaction.

10. The non-transitory computer-readable medium of claim 9, wherein the non-transitory computer-readable medium is also provisioned with program instructions that, when executed by at least one processor, cause the computing system to:

monitor the computing system for an indication of a command to generate the at least one file comprising the data content that is related to the distributed financial transaction; and detect the command to generate the at least one file, wherein the program instructions that, when executed by at least one processor, cause the computing system to associate the at least one file with the data element comprise program instructions that, when executed by at least one processor, cause the computing system to associate the at least one file with the data element based on detecting the command to generate the at least one file.

11. The non-transitory computer-readable medium of claim 10, wherein the program instructions that, when executed by at least one processor, cause the computing system to monitor the computing system for an indication of a command to generate the at least one file comprise program instructions that, when executed by at least one processor, cause the computing system to monitor the computing system for an indication of a command to generate the at least one file at a designated location on a file system of the computing system.

12. The non-transitory computer-readable medium of claim 8, wherein the program instructions that, when executed by at least one processor, cause the computing system to associate the at least one file with the data element comprise program instructions that, when executed by at least one processor, cause the computing system to embed the data element into the at least one file.

13. The non-transitory computer-readable medium of claim 8, wherein the at least one file is at least one first file, wherein the data element is at least one second file, and wherein the program instructions that, when executed by at least one processor, cause the computing system to associate the at least one file with the data element comprise program instructions that, when executed by at least one processor, cause the computing system to generate the at least one second file containing the global context identifier.

14. A method implemented by a computing system, the method comprising:
   receiving, from an upstream computing system, a message comprising data content that is related to a distributed financial transaction that spans at least the upstream computing system, the computing system, and a downstream computing system, the message comprising a global context identifier that identifies the distributed financial transaction;
   after receiving the message, (i) generating at least one file comprising the data content that is related to the distributed financial transaction, wherein the at least one file does not include the global context identifier, and (ii) storing the at least one file at the computing system;
   deciding to execute, as part of the distributed financial transaction, a file transfer of at least one file from the computing system to the downstream computing system;
   extracting, from the message, the global context identifier;
   before the file transfer is executed, generate a data element that comprises the global context identifier for association with the file transfer;
   associating the at least one file with the data element such that the data element is isolated from the data content; and
   executing the file transfer by transmitting the at least one file and the associated data element for receipt by the downstream computing system.

15. The computing system of claim 1, wherein the upstream computing system is a first upstream computing system, the message comprising data content is a first message comprising first data content, the global context identifier is a first global context identifier, and the distributed financial transaction is a first distributed financial transaction, and wherein the computing system further comprises program instructions that are executable by the at least one processor such that the computing system is configured to:
   receive, from a second upstream computing system, a second message comprising second data content that is related to a second distributed financial transaction that spans at least the upstream computing system, the computing system, and the downstream computing system, the second message comprising a second global context identifier that identifies the second distributed financial transaction; and
   extract, from the second message, the second global context identifier, wherein the at least one file further comprises the second data content that is related to the second distributed financial transaction, and wherein the data element further comprises the second global context identifier for association with the file transfer.

16. The computing system of claim 15, further comprising program instructions that are executable by the at least one processor such that the computing system is configured to:
   generate a new global context identifier that corresponds to aggregated data content in the at least one file, the aggregated data content comprising the first data content and the second data content, wherein the new global context identifier is linked to each of the first global context identifier and the second global context identifier, and wherein the data element further comprises the new global context identifier for association with the file transfer.

17. The non-transitory computer-readable medium of claim 8, wherein the upstream computing system is a first upstream computing system, the message comprising data content is a first message comprising first data content, the global context identifier is a first global context identifier, and the distributed financial transaction is a first distributed financial transaction, and wherein the non-transitory computer-readable medium is also provisioned with program instructions that, when executed by at least one processor, cause the computing system to:
   receive, from a second upstream computing system, a second message comprising second data content that is related to a second distributed financial transaction that spans at least the upstream computing system, the computing system, and the downstream computing system, the second message comprising a second global context identifier that identifies the second distributed financial transaction; and
   extract, from the second message, the second global context identifier, wherein the at least one file further comprises the second data content that is related to the second distributed financial transaction, and wherein the data element further comprises the second global context identifier for association with the file transfer.

18. The non-transitory computer-readable medium of claim 17, wherein the non-transitory computer-readable medium is also provisioned with program instructions that, when executed by at least one processor, cause the computing system to:
   generate a new global context identifier that corresponds to aggregated data content in the at least one file, the aggregated data content comprising the first data content and the second data content, wherein the new global context identifier is linked to each of the first global context identifier and the second global context identifier, and wherein the data element further comprises the new global context identifier for association with the file transfer.

19. The method of claim 14, wherein the upstream computing system is a first upstream computing system, the message comprising data content is a first message comprising first data content, the global context identifier is a first global context identifier, and the distributed financial transaction is a first distributed financial transaction, the method further comprising:

receiving, from a second upstream computing system, a second message comprising second data content that is related to a second distributed financial transaction that spans at least the upstream computing system, the computing system, and the downstream computing system, the second message comprising a second global context identifier that identifies the second distributed financial transaction; and extracting, from the second message, the second global context identifier, wherein the at least one file further comprises the second data content that is related to the second distributed financial transaction, and wherein the data element further comprises the second global context identifier for association with the file transfer.

20. The method of claim 19, further comprising:

generating a new global context identifier that corresponds to aggregated data content in the at least one file, the aggregated data content comprising the first data content and the second data content, wherein the new global context identifier is linked to each of the first global context identifier and the second global context identifier, and wherein the data element further comprises the new global context identifier for association with the file transfer.

\* \* \* \* \*